March 28, 1939.  R. W. SHOEMAKER  2,152,331
HELICAL-FIN HEAT-EXCHANGE UNIT AND METHOD OF PRODUCTION
Filed Oct. 26, 1936  2 Sheets—Sheet 1
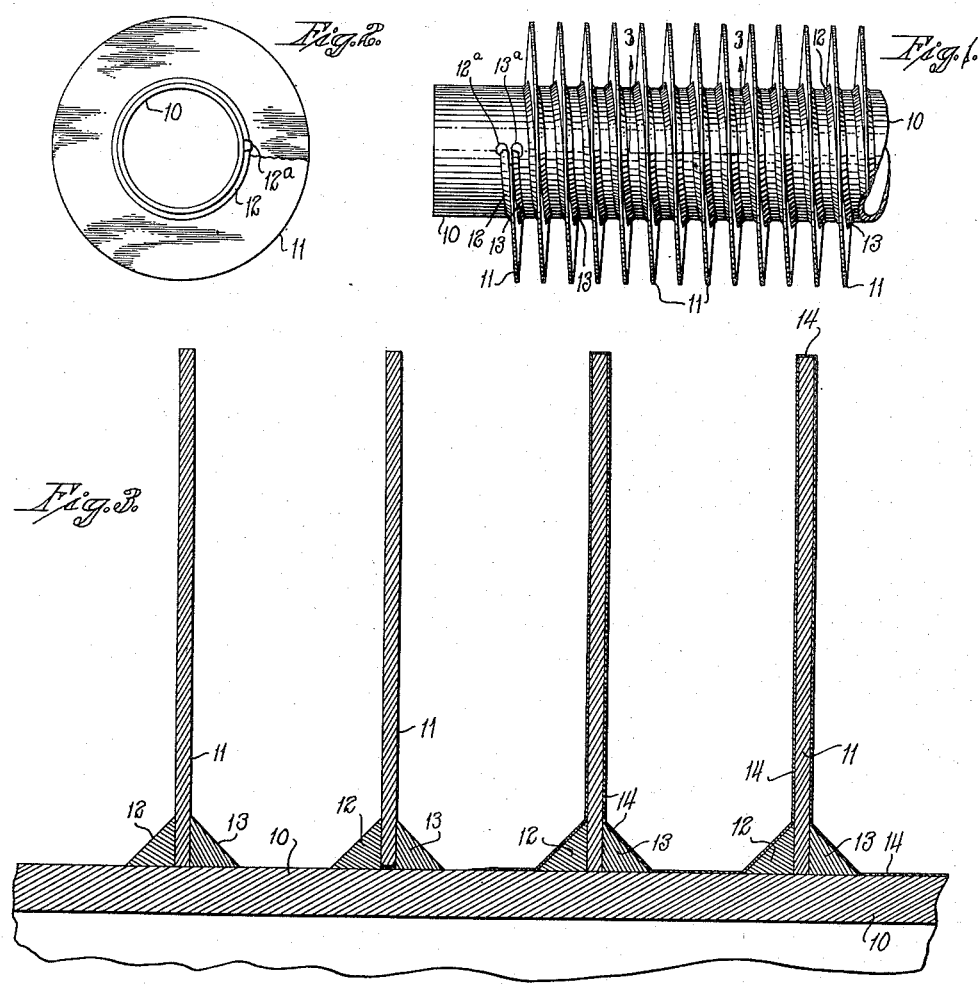
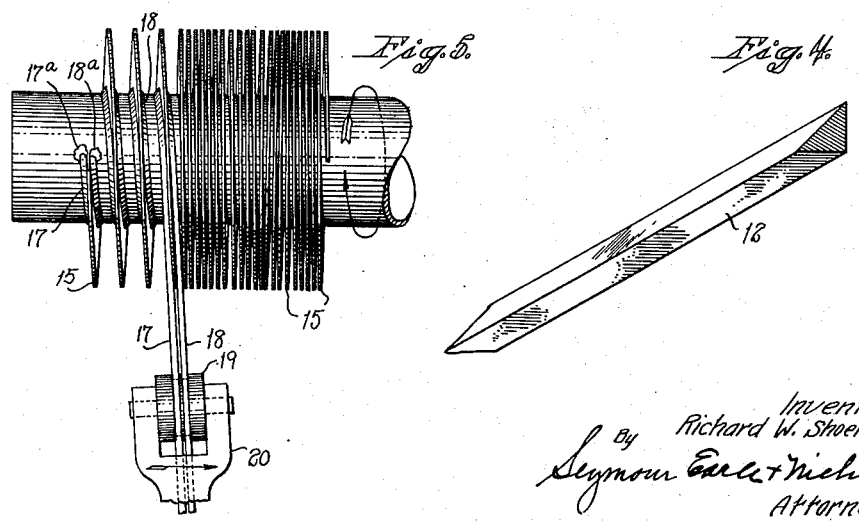
Inventor
Richard W. Shoemaker
By Seymour Earle + Nichols
Attorneys

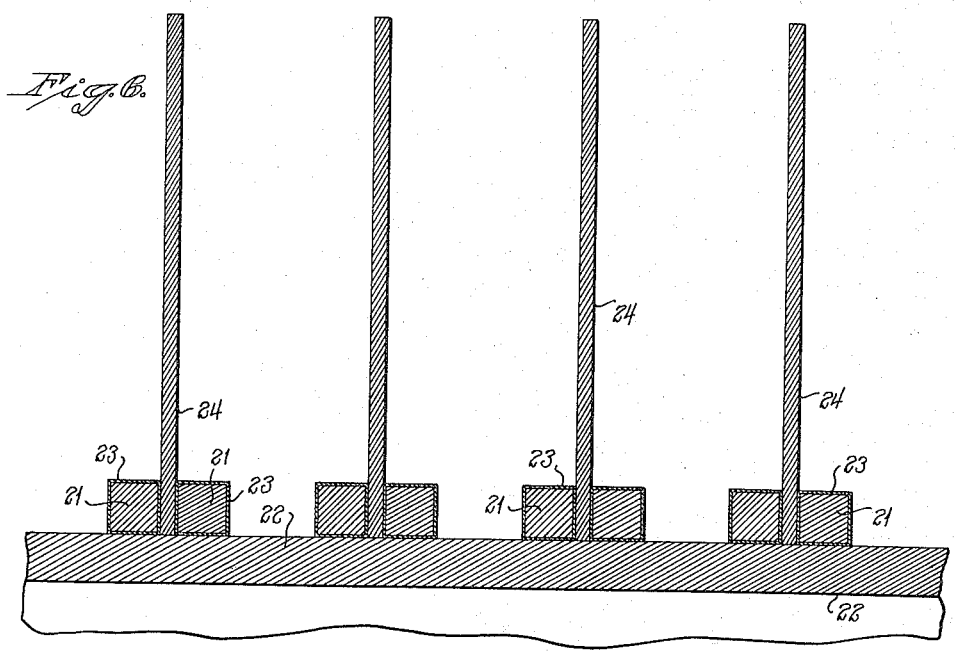
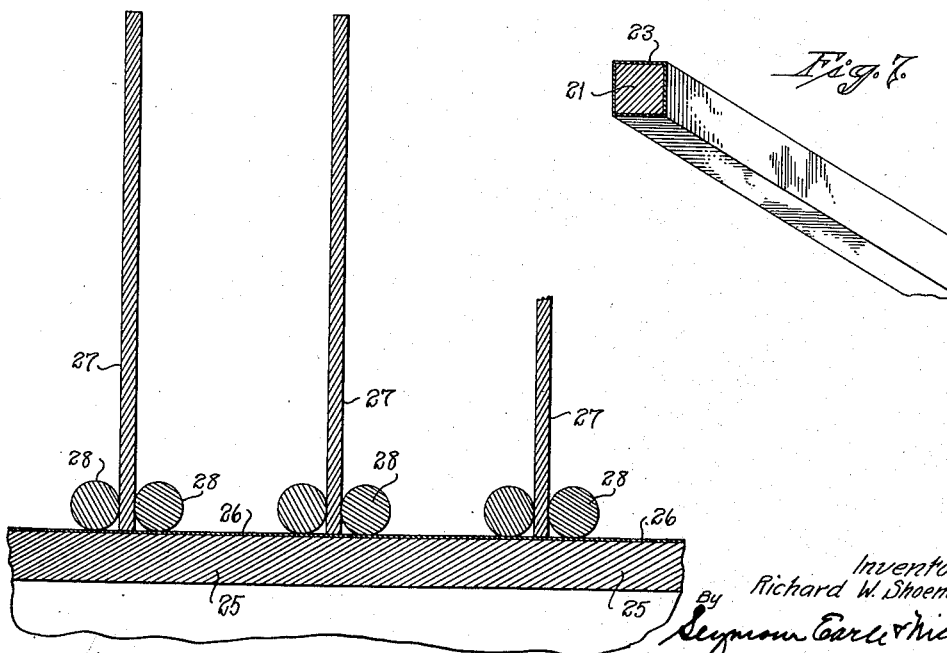

Patented Mar. 28, 1939

2,152,331

UNITED STATES PATENT OFFICE 2,152,331

HELICAL-FIN HEAT-EXCHANGE UNIT AND METHOD OF PRODUCTION

Richard W. Shoemaker, Woodbury, Conn., assignor to Chase Brass & Copper Co. Incorporated, Waterbury, Conn., a corporation of Connecticut Application October 26, 1936, Serial No. 107,552

6 Claims. (Cl. 113—118)

This invention relates to an improvement in heat-exchange units and particularly to that type of heat-exchange units which includes a tubular body-member having one or more thread-like helically-disposed fins upon its exterior surface.

One of the objects of the present invention is to provide a superior helical-fin heat-exchange unit of the type referred to and characterized by a highly-efficient heat-conductive union between its tubular body-member and its helical fin.

A further object is to provide a superior heat-exchange unit in which the helical fin is firmly stabilized and supported against displacement with respect to the tubular body-member.

Another object is to provide a construction whereby a strong, durable, mechanical union and highly-efficient heat-conductive union is effected between a helical fin and a tubular body-member, despite an appreciable degree of clearance between the inner edge of the said helical fin and the adjacent surface of the said tubular body-member.

A still further object is to provide a superior method whereby helical-fin heat-exchange units of the character referred to may be produced with facility and economy.

With the above and other objects in view, as will appear to those skilled in the art from the present disclosure, this invention includes all features in the said disclosure which are novel over the prior art.

In the accompanying drawings:

Fig. 1 is a broken view in side elevation of one form which a helical-fin heat-exchange unit may assume in accordance with the present invention;

Fig. 2 is an end view thereof;

Fig. 3 is a broken sectional view on an enlarged scale taken on the line 3—3 of Fig. 1 and showing a portion of the unit supplied with an all-over coating of solder or the like;

Fig. 4 is a broken perspective view of the stabilizing-strand employed in the structures of Figs. 1 to 3 inclusive;

Fig. 5 is a schematic plan view illustrating one mode of producing a finned heat-exchange unit in accordance with the present invention;

Fig. 6 is a broken, longitudinal, sectional view corresponding to Fig. 3 but showing another construction embodying the present invention;

Fig. 7 is a broken perspective view of the coated stabilizing-strand employed in the structure of Fig. 6; and Fig. 8 is a broken view in longitudinal section showing still another mode of fastening helical fins and stabilizing-strands to a tubular body-member.

The particular heat-exchange unit chosen for illustration in Figs. 1 to 3 inclusive comprises a tubular body-member 10 around the outer surface of which helically extends a helical fin 11 in the form of a ribbon having its major transverse plane extending substantially perpendicularly with respect to the axis of the said body-member. Also extending around the body-member 10 in intimate contact with the periphery thereof and with the inner portion of the said helical fin is a pair of complementary stabilizing-strands 12 and 13 which respectively extend helically along the respective opposite sides of the helical fin 11, as particularly well shown in Fig. 1.

As will be seen by reference to Figs. 3 and 4 in particular, the stabilizing-strands 12 and 13 are of polygonal (triangular) form so as to provide a maximum area for engagement with the adjacent surface of the body-member 10 and the adjacent side-surfaces of the helical fin 11. By this means a greater degree of heat-conductivity is effected between the body-member 10 and the fin 11 than would be the case were the said stabilizing-strands not present. Furthermore, the stabilizing strands serve to insure good heat-conduction between the elements 10 and 11, even though appreciable clearance may exist between the inner edge of the helical fin 11 and the periphery of the body-member 10.

The tubular body-member 10, the helical fin 11 and the helically-disposed stabilizing-strands 12 and 13 or their equivalents are made of a material having a high degree of heat-conductivity such, for instance, as copper or brass. Preferably, also, both the stabilizing-strands 12 and 13 and the helical fin 11 are fastened to the tubular body-member 10 and to each other. This fastening may be accomplished in a variety of different ways such, for instance, as by immersing the assembly in a bath of solder, tin, or other suitable material having a lower fusing-point than the material from which the elements 10 to 13 inclusive are formed, to provide a coating 14, as is schematically illustrated in the right-hand portion of Fig. 3. When the unit has been first properly treated with a suitable flux, the material of the coating 14 will also flow by capillary attraction between the contiguous surfaces of the elements 10 to 13 inclusive.

In some situations, however, especially where the elements are composed of copper, it may be desirable to leave the exterior of the heat-exchange unit uncoated so as to make available the high heat-emissivity of the copper material.

The fins 11 may be applied to the body-member 10 in any suitable manner such, for instance, as by helically winding a ribbon of metal edgewise upon the said body-member in accordance with prior practice or the said helical fin may be in helical form before its application to the said body-member 10. In any event, it is desirable to anchor, by brazing or the like, the ends of the complementary stabilizing-strands 12 and 13 to the body-member 10 as, for instance, at 12ª and 13ª before the said strands are wound in place upon the said body-member, which winding operation is the preferable one, though if desired the said stabilizing-strands 12 and 13 may also be helically preformed.

In Fig. 5 is schematically illustrated one mode of producing the heat-exchange units of the present invention. In the figure referred to a preformed helical fin or ribbon 15 of suitable material is positioned upon a tubular body-member 16 with the convolutions of the said fin spaced from each other as they may happen to be. Two complementary stabilizing-strands 17 and 18 are anchored as at 17ª and 18ª to the periphery of the body-member 16 and spaced from each other a distance substantially corresponding to the thickness of the fin or ribbon 15.

The stabilizing-strands 17 and 18 may be of round, rectangular, or other suitable cross-sectional form and may be passed over a grooved roller 19 mounted in a carriage 20 which is designed to move longitudinally of the body-member 16 as the latter is revolved at a predetermined rate of speed which will wind the stabilizing-strands 17 and 18 around the body-member 16 at a helix angle corresponding to the desired helix angle of the inner portion of the fin or ribbon 15 in the finished unit.

As the body-member 16 is revolved and the carriage 20 is caused to travel longitudinally with respect thereto, the stabilizing-strands 17 and 18 will be wrapped upon the body-member 16 in the manner already referred to and will serve to compel the miscellaneously-spaced convolutions (shown at the right of Fig. 5) of the ribbon 15 to assume the desired spacing with respect to each other as is indicated at the left-hand portion of Fig. 5. After the unit is assembled as described, the stabilizing-strands 17 and 18 may be fastened throughout their lengths to the body-member 16 and also to the adjacent portions of the fin or ribbon 15 in any suitable manner, such, for instance, as by immersing the entire unit in a bath of solder, tin or other suitable material which will melt at relatively-low temperatures.

As shown in Figs. 6 and 7, the stabilizing-strand or strands 21 may be of rectangular form in cross-section and may be provided, before their application to a tubular body-member 22, with a coating 23 of tin, solder, or the like having a lower melting-point than the material from which such stabilizing-strands proper are formed.

The stabilizing-strands 21 may be provided with the desired coating by passing them through a bath of molten solder or the like and then while the strand is hot wiping off excess material so that the coating will be relatively much thinner than is schematically indicated in Figs. 6 and 7.

When one or more of the stabilizing-strands as thus coated are helically disposed upon the exterior of the body-member 22 in close proximity to the inner portion of the convolutions of the fin 24, and the unit thus produced is subjected to a sufficiently-high temperature after being fluxed, the coating 23 upon the stabilizing-strand or strands will serve to fasten such strand or strands to the body-member 22 and to the helical fin 24. In addition, small amounts of solder will penetrate between the contiguous surfaces of the body-member 22 and the helical fin 24.

If desired and as schematically shown in Fig. 8, a body-member 25 may be provided upon its exterior surface with a coating 26 of solder or the like prior to the application thereto of a helical fin 27 and a stabilizing-strand 28. By using a suitable flux and heating the unit to a sufficiently-high temperature, the coating 26 may be melted and caused to fasten the helical fin 27 and the stabilizing-strand 28 to the body-member 25. During this action, also, capillary action will cause some of the molten coating 26 to creep between the contiguous surfaces of the stabilizing-strand 28 and the helical fin 27, to thus also fasten the two said elements together.

From the foregoing, it will be seen that by employing one or more suitable stabilizing-strands which will remain permanently in place when the unit is in use, a heat-conducting path of maximum efficiency is assured between the helical fin and the body-member, despite the fact that the said helical fin may not snugly engage the periphery of the said body-member. The efficiency of the heat-conducting path, just referred to, may be further increased by fastening the elements as before described. Thus, not only is the heat-conductive property improved, but the fins are definitely spaced by the stabilizing-strands and the tendency for the same to become displaced is minimized if not entirely obviated.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A helical-fin heat-exchange unit comprising: a tubular body-member of copper-base material having a substantially-smooth ungrooved outer surface; a pair of copper-base material complementary helical stabilizing-strands of substantially-rectangular form in cross-section extending around the exterior of the said body-member in intimate thermal engagement with the ungrooved outer surface thereof and spaced apart to snugly accommodate a fin between them; and a helical fin of copper-base material extending around the exterior of the said body-member and having its inner edge portion positioned between the said complementary substantially-rectangular stabilizing-strands; the said stabilizing-strands also being spaced apart intermediate each convolution of the said helical fin to leave the surface of the said body-member free for the access of air or other fluid thereto, and the said copper-base stabilizing-strands having a melting-point substantially corresponding to the melting-point of the said fin.

2. A helical-fin heat-exchange unit comprising: a tubular body-member of copper-base material having a substantially-smooth ungrooved outer surface; a pair of copper-base material complementary helical stabilizing-strands of substantially-rectangular form in cross-section extending around and fastened to the exterior of the said body-member in intimate thermal engagement with the ungrooved outer surface thereof and spaced apart to snugly accommodate a fin between them; and a helical fin of copper-base material also extending around the exterior of the said body-member and having its inner edge portion positioned between and fastened to the said complementary substantially-rectangular stabilizing-strands; the said stabilizing-strands also being spaced apart intermediate each convolution of the said helical fin to leave the surface of the said body-member free for the access of air or other fluid thereto, and the said copper-base stabilizing-strands having a melting-point substantially corresponding to the melting-point of the said fin.

3. A method of securing helical fins to the tubular body-members of helical-fin heat-exchange units, comprising: positioning a preformed helical fin upon a tubular body-member and winding a stabilizing-strand upon the said body-member at a helix angle substantially corresponding to the desired helix angle of the inner portion of the said helical fin and in between the convolutions of the said helical fin, and by means of the said stabilizing-strand compelling the convolutions of the said preformed helical fin to assume spaced positions with respect to each other substantially corresponding to the spacing of the convolutions of the stabilizing-strand as thus applied to the said body-member.

4. A method of securing helical fins to the tubular body-members of helical-fin heat-exchange units, comprising: positioning a preformed helical fin upon a tubular body-member and winding two complementary stabilizing-strands upon the said body-member in spaced relationship and at a helix angle corresponding to the desired helix angle of the inner portion of the said helical fin, the said complementary stabilizing-strands being wound between the convolutions of the said helical fin to compel the same to assume spaced positions with respect to each other upon the said body-member in intimate thermal engagement with the ungrooved outer surface thereof.

5. A helical-fin heat-exchange unit comprising a tubular body-member; a unitary helical-fin extending around the body-member, the said helical-fin comprising a series a unbroken convolutions having portions adjacent the inner peripheries thereof projecting substantially radially with respect to the body-member to be engaged by stabilizing-means; stabilizing-means comprising a pair of spaced complementary stabilizing-strands wound around and engaging the said body-member and also engaging the said radially-projecting portions at opposite sides thereof to support and stabilize the helical-fin on the said body-member; and bonding-means relatively fusible with respect to the other of the said elements of the unit and bonded to the relatively-nonfusing stabilizing-strands, body-member and radially-projecting portions of the helical-fin; whereby the said stabilizing-strands are bonded to the said body-member and are also respectively bonded to opposite sides of the convolutions of the helical-fin, and whereby the said stabilizing-strands also cooperate in providing a closed heat-conducting path from the said body-member by way of the said stabilizing-strands to the said opposite sides of the convolutions of the helical-fin.

6. A method of securing helical-fins to the tubular body-members of helical-fin heat-exchange units, comprising: positioning a preformed helical-fin upon a tubular body-member and winding stabilizing-means upon the said body-member at a helix angle substantially corresponding to the desired helix angle of the inner portion of the said helical-fin and between and in engagement with the convolutions thereof, and by means of the said stabilizing-means compelling the said convolutions of the helical-fin to assume spaced relationship with respect to each other substantially corresponding to the spacing of the said stabilizing-means on the said body-member; and applying bonding-means relatively-fusible with respect to the other of the said elements of the unit, at the fusing temperature of said bonding-means and bonding the said bonding-means to the relatively-non-fusing stabilizing-means, body-member and convolutions of the said helical-spring, to cause the said stabilizing-means to be bonded to the said body-member and to also be bonded to the said helical-fin.

RICHARD W. SHOEMAKER.